No. 891,581.

C. W. WOOD.
APPARATUS FOR HANDLING HAY, &c.
APPLICATION FILED OCT. 31, 1907.

PATENTED JUNE 23, 1908.

Fig. 1.

Clarence W. Wood
INVENTOR.

Witnesses

By

Attorneys

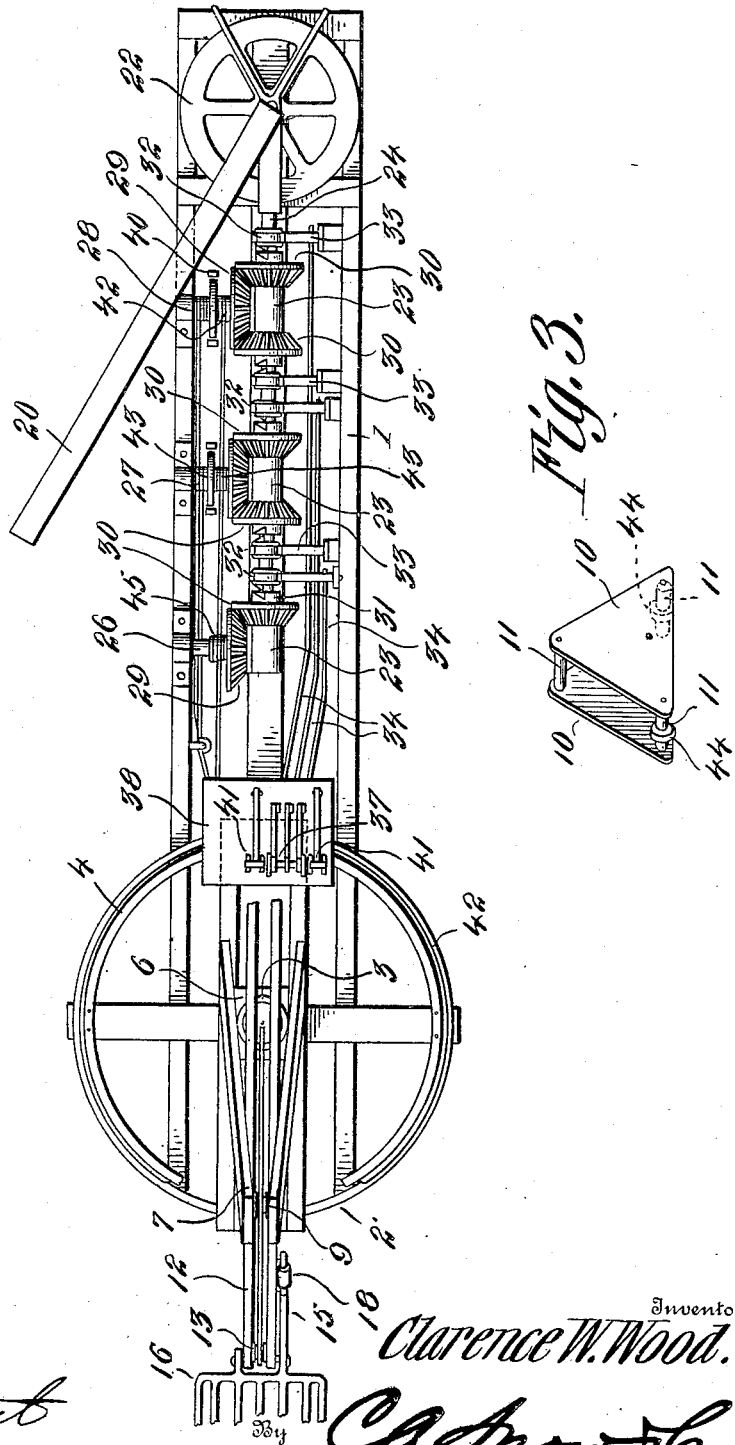

UNITED STATES PATENT OFFICE.

CLARENCE W. WOOD, OF ST. PAUL, MINNESOTA.

APPARATUS FOR HANDLING HAY, &c.

No. 891,581.   Specification of Letters Patent.   Patented June 23, 1908.

Application filed October 31, 1907. Serial No. 400,085.

*To all whom it may concern:*

Be it known that I, CLARENCE W. WOOD, a citizen of the United States, residing at St. Paul, in the county of Ramsey and State of Minnesota, have invented a new and useful Apparatus for Handling Hay, &c., of which the following is a specification.

This invention has relation to apparatus for handling hay, manure etc., and it consists in the novel construction and arrangement of its parts as hereinafter shown and described.

The object of the invention is to provide an apparatus of the character indicated which is adapted to be easily and readily operated for elevating the material and depositing the same upon a stack or upon vehicles as desired.

The power for operating the apparatus is preferably applied through a rotatable sweep adapted to be moved by draft animals although other means such as an engine may be employed if desired.

The apparatus consists primarily of a frame upon which is mounted a revoluble derrick which is operatively connected with an operating means and which is provided with a swinging boom also connected with an operating means. The sweep or engine is also mounted upon the said frame and is so arranged as to transmit movement to the said operating means when desired.

Figure 1 is a side elevation of the apparatus. Fig. 2 is a top plan view of the same and, Fig. 3 is a perspective view of boom support plates used in the apparatus.

The apparatus consists of the frame or platform 1 upon one end of which is mounted an annular track 2 having at its center a tubular pintle 3. The derrick consists of a circular base 4 mounted upon the wheels 5 which travel upon the track 2. Said base is provided at its center with a bearing 6 which is journaled upon the pintle 3. The beams 7 are mounted at their lower ends upon the base 4 to one side of the center thereof and are supported in inclined position upon the said base by means of the braces 8. The said beams 7 are spaced apart and support at their upper ends a pulley 9. At points substantially midway between the ends of the said beams and upon the inner sides thereof are attached the triangular plates 10 and the rollers 11 are journaled for rotation between the said plates. The boom 12 is mounted between the beams 7 and is arranged to move longitudinally upon the rollers 11. The boom 12 is provided at one end with a pulley 13 and at its opposite end with the laterally disposed blocks 14 which are adapted to limit the longitudinal movement of the said boom between the beams 7. The shank 15 of the fork 16 is pivotally attached to that end of the boom 12 which carries the pulley 13. The inner end of the shank 15 is chamfered as at 17 and is adapted to engage a spring actuated catch 19 mounted upon the boom. One end of the line 19 is attached to the catch 18 and the said line may be pulled by an operator whereby the catch 18 is disengaged from the shank 17 which will permit the fork 16 to tilt upon its pivotal support.

As illustrated in the accompanying drawing the means for supplying movement to the movable parts of the derrick consists of a sweep 20 which is fixed to a vertically disposed shaft 21. The beveled gear wheel 22 is also fixed to the shaft 21 and the said shaft 21 is journaled for rotation upon the frame or platform 1. The bearings 23 are also mounted upon the frame or platform 1 and the horizontally disposed shaft 24 is journaled for rotation in the bearings 23. The shaft 24 is provided at its outer ends with a beveled pinion 25 which is in mesh with the beveled gear wheel 22. The bearings 23 are three in number and upon the side of each is journaled for rotation a winding drum designated as 26, 27 and 28 respectively. Each of the said drums is provided at its inner ends with a beveled gear wheel 29 while the beveled gear wheels 30 are loosely mounted upon the shaft 24 and are in mesh with the beveled gear wheels 29. The gear wheels 30 are provided at their hubs with clutch members 31 while the clutch members 32 are slidably mounted upon the shaft 24 and rotate with the same. In connection with the beveled gear wheel 29 mounted upon the drum 26 there is but a single gear wheel 30 while in connection with the beveled gear wheels 29 mounted upon the drums 27 and 28 there are two gear wheels 30 for each gear wheel 29 and the said gear wheels 30 are located at the opposite sides of the respective gear wheels 29 with which they are associated so that the drums 27 and 28 may be positively turned in opposite directions. The drum 26, it will appear, may be positively turned through the shaft 24 and its attachments in one direction only. The levers 33 are fulcrumed upon the frame or platform 1 and are connected at their upper ends with the clutch members 32, each said lever having contact with a single clutch member. That lever 33 which is in engagement with the clutch member 32 adapted to be used for positively turning the drum 26 is pivotally connected to a rod 34 which in turn is pivotally connected to a rocker 35 mounted upon the frame or platform 1. The lower end of the rod 36 is also connected to said rocker 35 and the upper end of the rod 36 is connected to a lever 37 which is mounted upon a platform 38 supported above the frame 1 and to which is attached an operator's seat 39. The remaining levers 33 are connected in a similar manner to similar rods 34, rockers 35, rods 36 and levers 37 with the exception that two levers 33 are connected to each rod 34. The levers 33 that are located upon the same rod 34 have contact with the clutch members 32 lying upon the opposite sides of the drums 27 and 28. Consequently when the levers 37 are in vertical positions none of the drums 26, 27 or 28 will rotate but when one of the levers 37 is swung toward the derrick one of the clutch members 32 will be moved longitudinally of the shaft 24 to cause either the drum 26, 27 or 28 to rotate in one direction while if the same lever 37 (provided it is one of the levers for operating the drums 27 and 28) is moved in the opposite direction either of the drums 27 or 28 will rotate in the opposite direction. In other words, the lever 37 which is designed to operate the drum 26 is intended to be moved in one direction only while the levers 37 which are designed to operate the drums 27 and 28 are intended to be moved to one side or the other of a vertical position and are intended to so couple up the parts that the said drums 27 and 28 may be positively rotated in either of two directions. The drums 27 and 28 are provided with friction brakes 40 which are operatively connected with the treadle levers 41 mounted upon the platform 38. The cables 42 are reversely wound upon the drum 28 and pass around the base 4 of the derrick in opposite direction and are fixed at their ends to the said base 4. Consequently by causing the drum 28 to rotate in one direction as above described one cable 42 will be wound upon while the other cable 42 will be paid out from the drum so that the base 4 will be rotated upon its axis in one direction. By causing the drum 28 to rotate in the opposite direction the operation last above described will be reversed. Thus, means is provided for turning the derrick horizontally to one side or the other as desired.

The tackles 43 are reversely wound upon the drum 27 and pass through the pintle 3 up and over the pulleys 44 mounted upon the lower rollers 11 attached to the plates 10 and are fixed at their ends to the opposite end of the boom 12. Consequently, as the drum 27 is rotated one of the cables 43 is wound thereon so that the other cable 43 is paid out therefrom, consequently, the boom 12 will be moved longitudinally and the direction in which it is moved depends upon the direction in which the drum 27 is caused to rotate. The cable 45 is wound upon the drum 26 and passes through the pintle 3 up over the pulley 9 at the upper ends of the beams 7 down under the pulley 13 journaled at the end of the boom 12 and up to the upper ends of the beams 7 where it is fixed. As the drum 26 is rotated the cable 35 is wound thereon so that the end of the boom 12 to which the fork 16 is attached may be raised. The said end of the said boom is lowered by gravity.

In starting the operation of the apparatus the operator assumes position in the seat 39 and starts the draft animal attached to the sweep 20. He then throws the center lever 37 toward the derrick which causes (through the connections above described) the drum 27 to rotate. This operates upon the tackle 43 so that the boom 12 is moved or projected toward the hay or other material upon the ground. When the fork 16 enters the said material the operator draws the center lever 37 away from the derrick into an upright position and at the same time the brake 40 is applied to the drum 27 through the instrumentality of a treadle lever 41 and its connection. The lever 37 which is connected with the operating parts of the drum 26 is then swung toward the derrick and the said drum is caused to rotate which winds the tackle 45 thereon and elevates the fork 16 with the material thereon from the ground. When the material is sufficiently elevated the drum 28 is caused to rotate through its lever 37 and the derrick is swung around as above described so that the load upon the fork 16 may be carried over a stack or wagon body. As soon as the load arrives at the desired point the line 19 is pulled which disengages the catch 18 from the shank 15 of the fork 16 which permits the said fork to swing upon its supporting pivot and drop the load. Should the load be elevated sufficiently before it is swung around above the point at which it is desired to be dropped the lever 37 which is connected with the means for operating the drum 26 should be thrown back to a vertical position and the brake 40 applied to the drum 27 whereby the load will be held in mid air while it is being swung laterally. The parts in the apparatus are so arranged that the movements above described may be simultaneously accomplished or successively brought about in any desired order.

Having described my invention, what I claim as new and desire to secure by Letters-Patent is:—

1. In an apparatus as described, a derrick comprising a rotatable base, a beam erected thereon, a boom mounted upon the beam and adapted to move longitudinally with relation thereto, a fork pivotally attached to the boom a primary moving means and means for transmitting movement from the first said means to the derrick to turn the same, to the boom for moving the same longitudinally and to the boom for raising and lowering the same.

2. An apparatus as described, comprising a rotatable derrick, a longitudinally movable boom tiltably mounted thereon a prime mover connected to the derrick, winding drums interposed between the prime mover and the derrick and being respectively and operatively connected with the derrick for rotating the same, with the boom for moving the same longitudinally and with the boom for tilting the same and lever operated mechanisms for throwing the drums in gear with the prime mover whereby the movement of the derrick and its parts may be simultaneously or successively accomplished.

In testimony that I claim the foregoing as my own, I have hereto affixed my signature in the presence of two witnesses.

CLARENCE W. WOOD.

Witnesses:
 JAS. W. MOREHOUSE,
 OLIVER D. BILLING.